Aug. 20, 1946.  F. C. FRANK  2,406,068
WHEEL CONSTRUCTION
Filed July 20, 1944
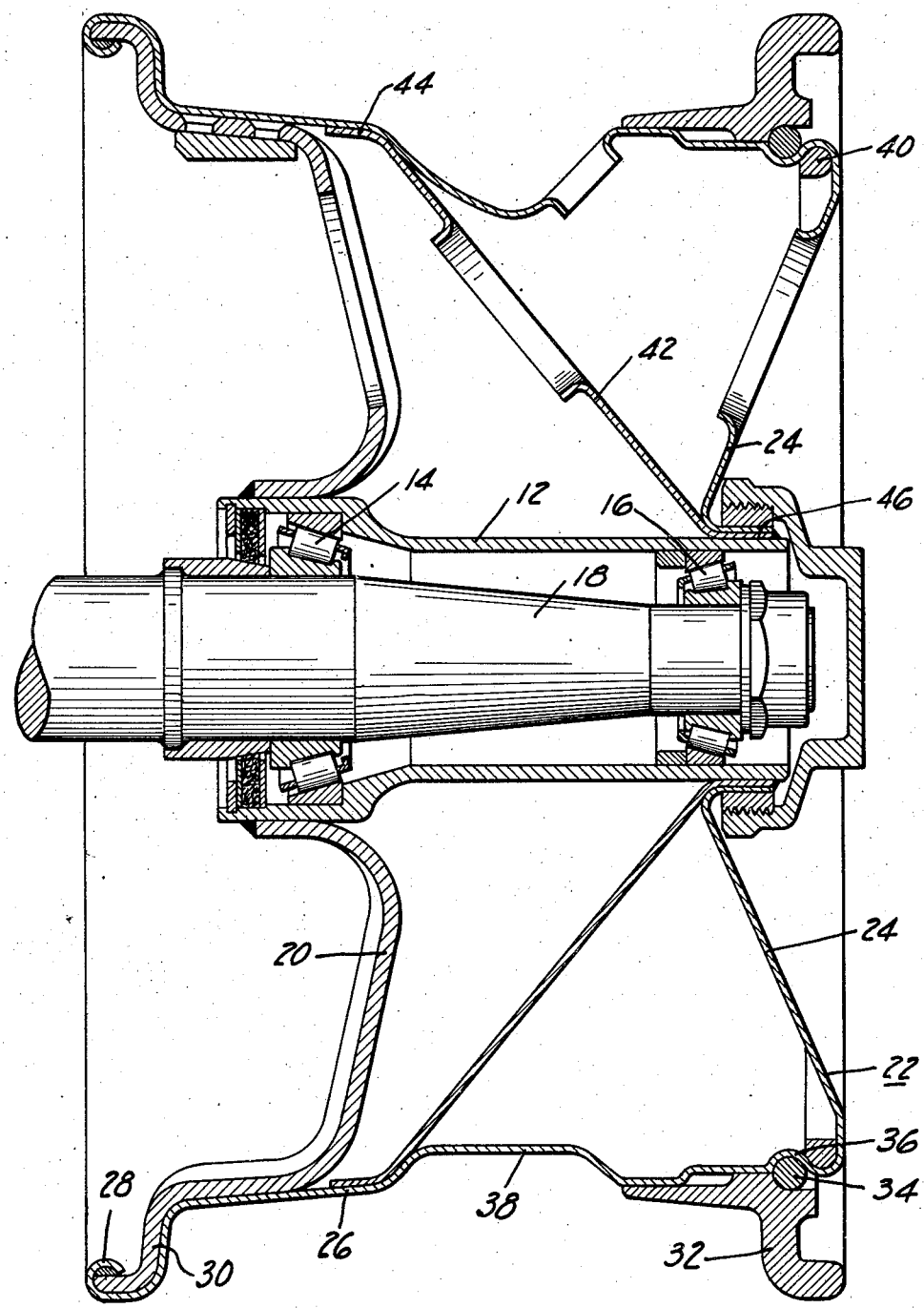
INVENTOR
FREDERICK C. FRANK
BY T. J. Plante
ATTORNEY Patented Aug. 20, 1946

2,406,068

UNITED STATES PATENT OFFICE 2,406,068

WHEEL CONSTRUCTION

Frederick C. Frank, South Bend, Ind., assignor to Bendix Aviation Corporation, South Bend, Ind., a corporation of Delaware Application July 20, 1944, Serial No. 545,769

1 Claim. (Cl. 301—63)

This invention relates to wheel construction, particularly adapted for use on airplanes, but not necessarily limited to such use.

An object of the invention is to provide a wheel construction which will be both light in weight and strong.

A further object of the invention is to provide a wheel construction which is relatively simple in form, and which can be manufactured relatively inexpensively.

A feature of the invention is the provision of a ring shaped reinforcing member which serves the two-fold purpose of supporting one of the parts of the wheel during preparation of said part and adding strength to the finished wheel construction.

A further feature of the invention is the provision of strengthening means for preventing undue damage to the wheel in case the tire goes flat.

Other objects and features of the invention will become apparent during the course of the following description, reference being had therein to the accompanying drawing in which the single figure is a vertical section taken through a wheel construction embodying the principles of my invention.

Referring to the drawing, the wheel is provided with the usual hub 12, which is supported on bearings 14 and 16 about an axle 18. Secured to the hub near one end thereof, by suitable means, such as welding, is a load carrying disc 20, which is preferably formed by means of stamping and drawing. A single rolled or drawn member, indicated generally at 22, is arranged to serve both as the load carrying disc at the opposite side of the wheel and as the wheel rim. The load carrying disc portion 24 of member 22 is secured to the hub 12 near the side opposite disc 20 by any suitable means, such as welding. The rim portion 26 of member 22, which is, of course, integral with the disc portion 24, is peened over the edge of disc 20, as shown at 28 and may be welded thereto. Both rim 26 and disc 20 are preferably formed with a permanent tire-retaining flange 30. At the opposite side of the wheel, a demountable flange 32 is maintained in place by means of a C ring 34, which fits into a groove 36 formed in member 22.

The rim portion 26 of member 22 is preferably provided with a reduced diameter portion or drop center 38. This is not intended to serve the usual purpose for which drop center rims are provided, i. e., making possible the lodgment and removal of the tire. In the present case the drop center portion 38 serves as a stiffening means for the wheel, particularly in case of tire failure. When such failure occurs, the cushioning effect of the air in the tire is no longer available to prevent localized stresses and deformations of the rim. The drop center portion 38 serves as a stiffening means to prevent such deformations, since it tends to equalize the stresses around the wheel rim.

A ring shaped reinforcing member 40 is located at the surface where the rim portion 26 of member 22 joins the integral load carrying disc portion 24 of said member 22. The ring shaped reinforcing member 40 serves the dual purpose of supporting member 22 during the rolling of rim portion 26 and also acting as a permanent reinforcement in the wheel structure. Reinforcement at the side of the wheel is particularly important, because the entire load tends to concentrate at the sides of the wheel.

In order to further strengthen the structure, I prefer to provide a conically shaped strengthening brace 42 secured to the under side of rim 26 at 44, and secured to hub 12 at 46.

Although a particular embodiment of my invention has been described, it will be understood by those skilled in the art that the object of the invention may be attained by the use of constructions different in certain respects from that disclosed without departing from the underlying principles of the invention. I therefore desire by the following claim to include within the scope of my invention all such variations and modifications by which substantially the results of my invention may be obtained through the use of substantially the same or equivalent means.

I claim:

In a wheel structure having a hub and a supporting disc secured to the hub at one side of the wheel, a unitary member constituting both the rim of the wheel and a supporting disc at the opposite side of the wheel, said member being secured to the hub at one end and to the outer portion of the first-mentioned supporting disc at the other end, and a ring-shaped reinforcing member located inside said unitary member at the curved surface between the rim and supporting disc portions of said unitary member, said ring-shaped reinforcing member constituting a support for the edge of said unitary member, and said rim having an annular depression to lock said reinforcing member against axial displacement.

FREDERICK C. FRANK.